Dec. 16, 1924.

A. B. KLEIN 1,519,919

CHROMOSCOPE

Filed Feb. 6, 1923

Inventor
Adrian B. Klein
By
Attorneys

Patented Dec. 16, 1924.

1,519,919

UNITED STATES PATENT OFFICE.

ADRIAN BERNARD KLEIN, OF LONDON, ENGLAND, ASSIGNOR OF ONE-HALF TO ADAM HILGER, LIMITED, OF LONDON, ENGLAND.

CHROMOSCOPE.

Application filed February 6, 1923. Serial No. 617,341.

*To all whom it may concern:*

Be it known that I, ADRIAN BERNARD KLEIN, a subject of the King of Great Britain, of 32 The Pryors, East Heath Road, Hampstead, London, N. W. 3, England, have invented new and useful Improvements in Chromoscopes; and I do hereby declare the following to be a full, clear, and exact description of the same.

The present invention relates to chromoscopes. Such instruments have been used in connection with three colour printing and are also useful in connection with textile printing for observing the artistic effect of altering the colours of parts of vari-coloured designs, slides corresponding to different parts of the designs being illuminated by light of selected colours and, with the aid of inclined transparent reflectors arranged in line, being viewed simultaneously in correct relative superposition through a suitable eyepiece. By altering the colours of the light illuminating the various slides any desired effects may be obtained and observed as a guide for subsequently printing the design on calico or other textile materials. The device is also of assistance in connection with wall paper printing, weaving and other manufacturing processes making use of coloured designs.

As at present constructed chromoscopes have only been practical for dealing with designs having three colours or less, owing to double images produced by the employment of glass or like transparent reflectors for obtaining superposition of the images obtained by the several slides. The primary object of the present invention is to avoid this undesired effect and to enable a larger number of slides to be satisfactorily dealt with, whereby the effect of printing in more than three colours can be accurately observed.

With the above object in view the improved chromoscope according to this invention makes use of reflecting devices consisting of extremely thin celluloid films for obtaining superposition of the various images, films of the order of one light wave length in thickness having been found suitable.

Another object of the invention is to provide improved optical arrangements of the slides and reflectors to secure economy of space, whereby chromoscopes for dealing with large numbers of slides may be constructed of smaller size than heretofore.

A practical method of manufacturing thin celluloid films suitable for use as the aforesaid reflecting devices with great accuracy, consists in applying a solution of celluloid to a soluble base rotated at a high speed, affixing a mount to the film formed when the solution has dried, and then dissolving the soluble base so as to leave the thin celluloid film attached to the mount. By this method reflecting devices can be manufactured of so much less thickness than glass that the formation of double images is not perceptible to the eye, whilst the accuracy is such that there is no visible distortion.

In order that the invention may be more clearly understood and readily carried into practice, I have appended hereto one sheet of drawings illustrating the same, wherein:—

Figure 1:
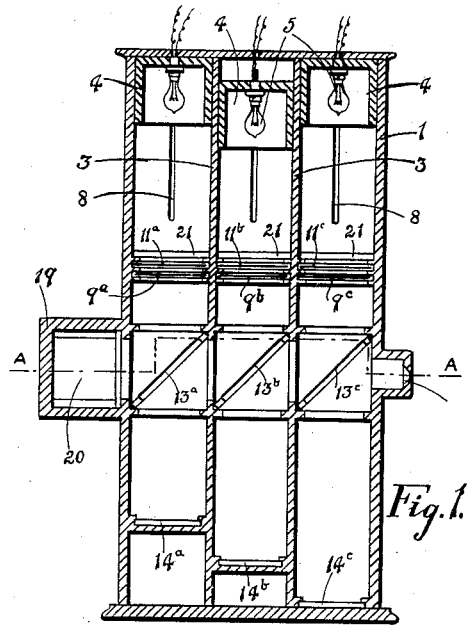
Figure 1 is a vertical section on the line B—B of Figure 3, of a six slide chromoscope embodying my invention.
Figure 2:
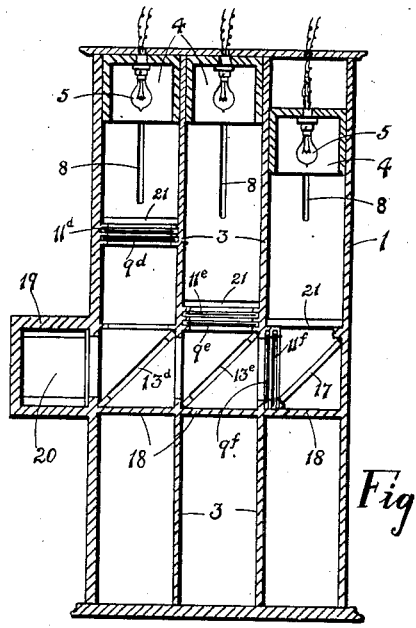
Figure 2 is a similar view on the line B—C of Figure 3.
Figure 3:
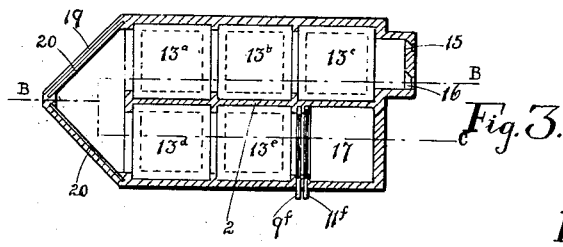
Figure 3 is a horizontal plan in section on the line A—A of Figure 1.
Figure 5:
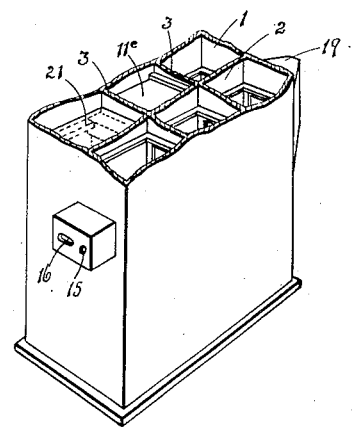
Figure 5 is a front sectional perspective view of the chromoscope.
Figure 4:
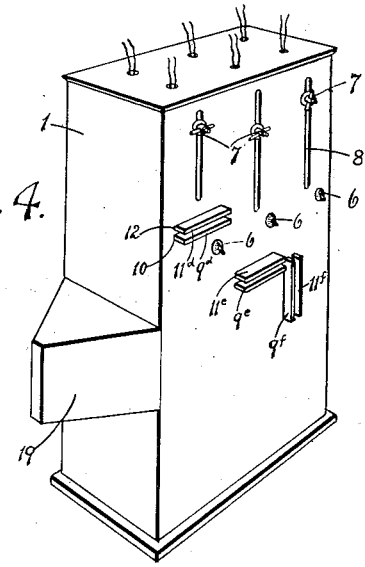
Figure 4 is a rear perspective view of the chromoscope.

Referring to the drawings, the instrument comprises a casing 1 divided into two parallel vertical chambers by a partition 2, each sub-divided in a transverse direction into three compartments by cross partitions 3. In the upper end of each of the six compartments thus formed is slidably arranged in a carrier 4 an electric lamp 5 controlled by a switch 6 mounted externally of the casing 1 and fed with current by suitable flexible wires. The carriers 4 are adjustable in position by means of fly nuts 7 carried by screws projecting from the carriers 4 through slots 8 in the casing 1.

On one side of the partition 2 slides $9^a$, $9^b$, $9^c$ bearing portions of the design in transparency are positioned beneath the lamps 5 in suitable grooves through horizontal slots 10 in the casing 1 and above the slides are positioned screens $11^a$, $11^b$, $11^c$ of coloured gelatine or other material through which the light from the lamp 5 passes before reaching the corresponding slides, said slides being inserted into position through horizontal slots 12 in the casing 1. Beneath the slides are arranged transparent reflectors $13^a$, $13^b$, $13^c$ consisting of thin celluloid films, these being arranged in line and inclined at an angle of 45° to the slides. Beneath these reflectors are horizontally arranged opaque reflectors or mirrors, preferably of glass, $14^a$, $14^b$ and $14^c$. In line with the inclined reflectors viewing apertures 15, 16 are provided in the wall of the casing, one aperture 15 being round and the other 16 being elongated, whereby the viewing means is adapted to differently spaced eyes and concentration of gaze is ensured. The cross partitions 3 are apertured in line with the inclined reflectors so that a clear view of the images produced in the reflector is obtained through the viewing apertures.

Similarly on the other side of the partition 2 slides $9^d$, $9^e$ are positioned beneath two of the lamps 5 through horizontal slots in the casing 1, and coloured screens $11^d$ and $11^e$ are positioned above the slides through horizontal slots, and thin transparent celluloid reflectors $13^d$, $13^e$ disposed beneath the slides in inclined positions in line and at the same height in the apparatus as the reflectors $13^a$, $13^b$, $13^c$. The remaining slide $9^f$ and screen $11^f$ are disposed vertically behind and in line with the reflectors $13^d$, $13^e$ and are illuminated by the corresponding lamp 5 through the intermediary of an inclined opaque mirror or reflector 17 disposed vertically beneath the lamp 5 and in line with the slide $9^f$ and the inclined transparent reflectors $13^d$, $13^e$. A horizontal partition 18 is arranged across the casing beneath the reflectors $13^d$, $13^e$ and 17 and the vertical partitions 3 are again apertured in line with the inclined reflectors as on the other side of the partition.

On the wall of the casing 1 opposite to the viewing apertures 15 and 16 is provided a housing 19 containing two opaque mirrors 20 disposed vertically and at right angles to each other and inclined at 45° opposite the lines of inclined reflectors $13^a$, $13^b$, $13^c$ and $13^d$, $13^e$ and 17 respectively.

From the foregoing description it will be apparent that the slide $9^f$ will be illuminated with light coloured by the screen $11^f$ and reflected by the mirror 17. Further, coloured images of the slides $9^d$ and $9^e$ will be thrown on the inclined reflectors $13^d$, $13^e$. Consequently the reflectors $13^d$ and $13^e$ being transparent their images superposed on the illuminated slide $9^f$ will form a combined image on the corresponding inclined mirror 20, which will be reflected on to the opposite inclined mirror 20 disposed in line with the reflectors $13^a$, $13^b$, $13^c$.

The slides $9^a$, $9^b$, $9^c$ being also illuminated with coloured light will produce images in the parallel disposed mirrors $14^a$, $14^b$, $14^c$, the greater part of the light passing freely through the inclined reflectors $13^a$, $13^b$, $13^c$. Such images will then be reflected back again on to the inclined reflectors $13^a$, $13^b$, $13^c$ by which they will then be reflected towards the viewing apertures 15, 16. Consequently from said viewing apertures the images on the transparent reflectors $13^a$, $13^b$, $13^c$ will be seen in superposition on the image seen in the inclined mirror 20 in line therewith. Thus the images of all the slides will be seen in superposition, each slide producing a portion of the image in the colour of the screen used therewith. Thus a complete design made up of any six colours can be viewed and the colours changed as desired to produce different final results. By switching off one or more of the lamps 5 any of the slides can be rendered inoperative, without affecting the operativeness of the remaining slides, so that it is possible to view simple designs made up of only one or two coloured portions of the complete design for the time being under examination.

It will be observed from the drawings that the slides $9^d$, $9^e$ are arranged at different distances from their reflectors $13^d$, $13^e$ whilst the slide $9^f$ is viewed without the aid of an inclined transparent reflector. Also the opaque mirrors $14^a$, $14^b$ and $14^c$ are at different distances from the reflectors $13^a$, $13^b$ and $13^c$. This is done because to produce a proper combination of the slides the apparent sizes of the various slides at the viewing apertures must be equal, for which purpose it is essential that the optical paths from all the slides to the viewing aperture be equal, so that in effect all the slides are placed optically at the same distance from the viewing aperture, whilst nevertheless they are viewed in superposition. Obviously the slide $9^f$ could be arranged similarly to the slides $9^d$, $9^e$ so as to be viewed indirectly, and further although the slides $9^a$, $9^b$, $9^c$ are equally distanced from their reflectors $13^a$, $13^b$, $13^c$ they could be differently spaced, with or without the reflectors $14^a$, $14^b$ and $14^c$ equally spaced from the inclined reflectors, provided only that the aforesaid optical paths are kept equal.

The lamps 5 are made adjustable so that the various slides may be illuminated with any desired relative light strengths, the required strengths varying with the colours of the coloured screens employed and the relative strengths it is desired to give the various slides in the complete design. Also in order to assure even illumination of the slides a light diffusing screen 21 as a sheet of frosted glass is preferably provided between the lamp and slide.

Although simple viewing apertures 15 and 16 are suitable as a viewing means for the apparatus, we may if desired provide for this purpose an ordinary monocular or binocular telescope for viewing the superposed images in place of a plain aperture or apertures. Moreover, in lieu of providing a viewing aperture, or apertures, or an eye piece, a projection objective may be provided whereby the superposed images may be projected on to a screen, such an arrangement being particularly suitable for instructional purposes.

The transparent celluloid reflecting films may be of various thicknesses, but I have found a thickness of the order of one light wave length to be suitable.

In manufacturing such thin celluloid reflecting films a suitable celluloid solution is 1 part of celluloid to 10 parts of amylacetate, but the proportions may be varied to produce different degrees of viscosity according to the thickness desired for the finished film and the speed of rotation of the soluble base. As the soluble base I may employ a thin sheet of rock salt, preferably of the order of $\frac{1}{10}''$ in thickness which is polished truly flat and then mounted in any convenient manner on a vertical rotatable spindle. During and/or after application of the celluloid solution to the rock salt base the spindle is rotated at a speed depending on the viscosity of the celluloid solution and the thickness of film required. With a solution such as specified above a suitable speed is 300 R. P. M.

When the solution has spread out uniformly it is allowed to dry and after removal of the rock salt base and film from the spindle, they are warmed slightly, as by being placed on a "hot plate." The mount to be attached to the films, preferably a brass frame of sufficient rigidity and accuracy of construction to prevent and avoid deformation of the film, is then coated with a suitable cement, which may be Canada balsam or varnish, and placed upon the film. When the cement has spread uniformly, if necessary after additional warming, the whole is allowed to cool slowly.

The amount is then supported above water in such a way that the water is just short of level with the film until the rock salt has dissolved away, leaving the celluloid film attached to the mount. It is necessary for the rock salt base to be comparatively thin so that it shall dissolve rapidly and uniformly.

Various modifications in the apparatus and process herein described may obviously be made without departing from the scope of the claims appended hereto and forming part of this specification.

What I claim is:—

1. A chromoscope comprising a plurality of slides having portions of a design in transparency thereon, means for illuminating said slides with light of selected colours, said slides being divided into a plurality of sets, a series of transparent reflectors for one set of slides adapted to direct images thereof in superposition to a viewing point in the apparatus, and means for producing images of another set of slides and optically transferring them in superposition behind said inclined transparent reflectors, whereby images of all of said slides are seen in superposition from the viewing point.

2. A chromoscope comprising a plurality of slides having portions of a design in transparency thereon, means for illuminating said slides with light of selected colours, a plurality of transparent reflectors through which images of corresponding slides are passed, and a plurality of mirrors disposed parallel to corresponding slides but on the opposite side of said transparent reflectors, said transparent reflectors being arranged in line and so inclined as to direct towards a viewing point in the apparatus in superposition images of the slides produced thereon by reflection of the corresponding slides from said mirrors.

3. A chromoscope as set forth in claim 2, having the slides and mirrors so located that the optical paths from the slides to the viewing point are equal.

4. A chromoscope as set forth in claim 1, comprising as the image producing means for the other set of slides a series of reflecting devices, including transparent reflecting devices, arranged one behind the other opposite the slides and inclined oppositely from the transparent reflecting devices of the first set of slides, and as image transferring means a pair of mirrors arranged at right angles, and disposed opposite the ends of the two lines of reflecting devices remote from the viewing point with their surfaces equally inclined to said lines.

5. A chromoscope comprising a plurality of compartments arranged side by side in sets, viewing means in a wall of one of said compartments, transparent inclined reflectors in all the compartments of that set arranged one behind the other in line with the viewing device and inclined at 45° away from said device, apertures in the walls of said compartments between the reflecting devices, illuminated slides disposed opposite said reflectors in directions at right angles to the line of reflectors so that images thereof are reflected towards the viewing device, reflectors, including transparent reflectors, disposed in line in another set of apertured compartments at the same level as and parallel to the first mentioned reflectors but inclined in the opposite direction thereto, illuminated slides and mirrors disposed parallel to one another on opposite sides of and at right angles to the second line of inclined reflectors in such manner that images of the slides are reflected through the intermediary of the parallel mirrors and inclined reflectors in superposition in a direction away from the viewing device, a pair of mirrors disposed in line with the ends of the two sets of inclined reflectors remote from the viewing device and so inclined as to reflect the superposed images from the second set of inclined reflectors through the first set of inclined reflectors to the viewing device, and means for illuminating said slides at will with light of selected colours.

6. A chromoscope as set forth in claim 5 including a slide disposed in line behind the transparent reflectors of the second set of inclined reflectors and means for illuminating said slide with light of a selected colour, whereby the images on said transparent reflectors are superposed directly on said slide for reflection by the pair of mirrors to the viewing device.

7. A chromoscope as set forth in claim 5, including a slide disposed in line behind the transparent reflectors of the second set of inclined reflectors and an inclined mirror behind said slide and a lamp and colored screen disposed laterally of said slide, whereby the images on said transparent reflectors are superposed directly on said slide for reflection by the pair of mirrors to the viewing device.

8. A chromoscope as set forth in claim 5, including a slide disposed in line behind the transparent reflectors of the second set of inclined reflectors and means for illuminating said slide with light of a selected color, whereby the images on said transparent reflectors are superposed directly on said slide for reflection by the pair of mirrors to the viewing device, and wherein the slides and mirrors corresponding and parallel thereto, if any, are so positioned that the optical paths from the slides to the viewing devices are equal in length.

In testimony whereof I affix my signature in presence of two witnesses.

ADRIAN BERNARD KLEIN.

Witnesses:
 CHARLES S. PARSONS,
 A. B. TOMKINS.